(12) United States Patent
Bider et al.

(10) Patent No.: US 11,597,065 B2
(45) Date of Patent: Mar. 7, 2023

(54) PRESSURE MEASURING DEVICE FOR CRIMPING TOOL

(71) Applicant: Ilsco Corporation, Cincinnati, OH (US)

(72) Inventors: James Bider, South Elgin, IL (US); William Mitchell, Cincinnati, OH (US); Bill Wolins, Cincinnati, OH (US)

(73) Assignee: Ilsco, LLC, Cincinnati, OH (US)

( * ) Notice: Subject to any disclaimer, the term of this patent is extended or adjusted under 35 U.S.C. 154(b) by 256 days.

(21) Appl. No.: 17/001,106

(22) Filed: Aug. 24, 2020

(65) Prior Publication Data

US 2021/0086335 A1    Mar. 25, 2021

Related U.S. Application Data

(60) Provisional application No. 62/904,746, filed on Sep. 24, 2019.

(51) Int. Cl.
*B25B 27/14*    (2006.01)
*B25B 29/00*    (2006.01)
(Continued)

(52) U.S. Cl.
CPC ............ *B25B 27/146* (2013.01); *B25B 29/00* (2013.01); *G01L 7/16* (2013.01); *H01R 43/0486* (2013.01)

(58) Field of Classification Search
CPC ......... G01L 5/226; G01L 7/16; G01L 5/0076; G01L 1/06; G01L 5/009; G01L 19/0015; G01L 5/0038; G01L 1/16; G01L 5/00; B25B 27/146; B25B 27/10; B25B 7/12; B25B 7/02; B25B 7/123; B25B 27/14; B25B 7/04; B25B 7/22; B25B 7/00; B25B 7/06; B25B 27/02; B25B 27/0014; B25B 28/00; B25B 7/14; B25B 31/00; B25B 27/023; B25B 7/126; B25B 17/00; B25B 27/00; B25B 7/10; B25B 33/00;
(Continued)

(56) References Cited

U.S. PATENT DOCUMENTS 3,167,953 A    2/1965  Dillon
3,940,838 A *  3/1976  Gryctko ............... H01R 43/042
                                                    D8/52
(Continued)

*Primary Examiner* — Andre J Allen
(74) *Attorney, Agent, or Firm* — Wood Herron & Evans LLP

(57) ABSTRACT

Pressure gauges according to this invention provide pressure measurement on all brands of crimping tools, including 6-Ton D3 tools. In particular, this design eliminates the need to remove the tool crimp head to measure the pressure of the crimping tool. Additionally, this design eliminates the need to install additional dedicated fixtures on the crimping tool to measure the ram pressure. This design incorporates a self-centering profile to avoid side-loading when mounting the pressure gauge in the crimping tool. The dial indicator on pressure gauges of this invention captures and holds the maximum pressure reading with the use of a simple manual lever. The lever can be easily reset for the next pressure reading. Pressure gauges according to various embodiments of this invention include dual piston pressure sensors. Additionally, pressure measurement is accomplished with a simple hydro mechanical manometer display.

22 Claims, 4 Drawing Sheets

(51) Int. Cl.
*G01L 7/00* (2006.01)
*G01L 7/16* (2006.01)
*H01R 43/048* (2006.01)

(58) Field of Classification Search
CPC . B25B 25/005; B25B 21/001; B25B 23/0007;
B25B 25/00; B25B 27/04; B25B 27/026;
B25B 7/16; B25B 23/1456; B25B
27/0092; B25B 23/0092; B25B 27/0007;
B25B 27/12; B25B 5/147; B25B 7/18;
B25B 13/481; B25B 21/00; B25B 23/145;
B25B 5/00; B25B 7/20; B25B 9/00;
B25B 23/00; B25B 27/143; B25B 29/02;
B25B 5/12; B25B 11/00; B25B 27/0035;
B25B 27/0085; B25B 27/16; B25B 27/30;
B25B 29/00; B25B 31/005; B25B 5/08;
B25B 5/14; B25B 7/08; B25B 11/02;
B25B 13/18; B25B 13/44; B25B 13/465;
B25B 13/5058; B25B 13/56; B25B
15/001; B25B 15/02; B25B 23/0035;
B25B 23/04; B25B 27/06; B25B 3/00;
B25B 5/04; B25B 5/103; B25B 5/142;
B25B 9/04; B25B 5/163
See application file for complete search history.

(56) References Cited

U.S. PATENT DOCUMENTS

| | | | |
|---|---|---|---|
| 4,546,657 | A | 10/1985 | Jaeger |
| 4,823,455 | A * | 4/1989 | Desiro ................. B23P 15/26 |
| | | | 72/384 |
| 5,172,737 | A | 12/1992 | Scruggs et al. |
| 5,195,042 | A | 3/1993 | Ferraro et al. |
| 5,299,463 | A | 4/1994 | Gross |
| 6,164,106 | A | 12/2000 | Nghiem et al. |
| 6,966,230 | B2 | 11/2005 | Frenken |
| 7,036,806 | B2 | 5/2006 | Amherd et al. |
| 2006/0027024 | A1* | 2/2006 | Fujimori ............ G01L 19/0015 |
| | | | 73/700 |
| 2012/0314226 | A1 | 12/2012 | Kelly |
| 2018/0309256 | A1 | 10/2018 | Glockseisen |
| 2021/0323136 | A1* | 10/2021 | Hyde ...................... B25F 3/00 |
| 2022/0077642 | A1* | 3/2022 | Riechmann ......... B30B 15/0094 |
| 2022/0085562 | A1* | 3/2022 | Riechmann ............... B30B 7/04 |

* cited by examiner

PRESSURE MEASURING DEVICE FOR CRIMPING TOOL

This application claims the benefit of U.S. Provisional Patent Application Ser. No. 62/904,746, filed Sep. 24, 2019 and hereby incorporated by reference in its entirety.

BACKGROUND OF THE INVENTION

This invention relates to a force monitoring device for a crimping tool. More particularly, this invention relates to a pressure gauge to measure the crimping force of a crimping tool.

Crimpers, also called crimping tools, pinch wire terminals and connectors to wires or conductors to prepare them for use in electrical or communications applications. They have nests and indenters that vary in size and shape according to application. Manual crimpers are suitable for portable applications that create small terminal connections while power crimpers use air, electricity, hydraulic power, or a combination of these to aid compression, and are used in high volume applications. Crimpers can be used for applications ranging from manual field repairs to fully automated terminal production operations.

Modern compression style electrical compression connectors are crimped to secure the wire to the connectors. Crimping tools have a variety of crimping profiles and pressure levels to accomplish the task. To ensure proper applied crimping pressure the tool operators regularly have their tools calibrated. One popular crimping tool is referred to as 6 ton tool. Each crimping tool may have a variety of crimping dies or profiles and one common die is referred to as a D3 crimping die. Manufacturers of crimping tools may offer pressure gauges to calibrate their crimping tools. However, such manufacturers only offer dedicated gauges for their own tools.

Measurement of a crimp force is of particular interest when crimping to ensure a good crimp is achieved, particularly when using hand-operated and battery operated mechanical crimp tools. Existing crimp tools do not indicate the crimping pressure to produce a good crimp during a crimping process. Large crimp tools, such as hydraulic and pneumatic crimp tools, use pressure transducers that measure the operating pressure of the compressible fluid used to drive the crimp tool. The small mechanical crimp tools are hand-operated and, thus, do not have compressible fluid that can be measured to determine whether a good or bad crimp was obtained. Accordingly, a need exists for a gauge that measures a crimping force to determine whether a good or bad crimp was obtained regardless of the make of the crimping tool.

Because mechanical crimp tools do not monitor the force applied during the crimping process, conductor insulation can be damaged by applying excessive force during the crimping process. Although such force typically does not damage the conductor, the insulation can split or otherwise be damaged, thereby creating a conductive path through the insulation. Accordingly, a need exists for a crimping tool gauge that measures the crimping force to produce a quality crimp resulting from the crimping process.

Some pressure gauges for crimping tools do not measure the actual applied pressure delivered by the crimping tool. Such gauges measure the pressure of the tool's actuation ram and then an implied crimping pressure is calculated through the mechanical leverage of the tool head to the D3 or die area. These calculation methods do not account for variations from power transmission through levels of tolerance, friction and deformation. As such, the pressure gauge fails to account for all factors which influence the force delivered by the crimping tool.

Other known pressure gauges for crimping tools require inserts or modifications to the crimping tool jaws to obtain a pressure reading. Such devices, as a result, are cumbersome to use and require added hardware and devices to obtain a pressure reading on a variety of different crimping tools.

These and other shortcomings with known pressure gauges for crimping tools need to be addressed to provide a pressure gauge which measures the actual crimping pressure applied by a variety of different crimping tools from a variety of manufacturers without the need for added fixtures or supporting devices.

SUMMARY OF THE INVENTION

Pressure gauges for crimping tools according to various embodiments of this invention address these and other shortcomings in the prior art. According to various embodiments of this invention, a pressure gauge of this invention accurately and directly measures the actual applied pressure in electrical connector crimping tools. The existing methods measure the pressure of the tool actuation ram and then calculates an implied application pressure through mechanical leverage of the tool head to the D3 area. These calculation methods do not account for variations from power transmission through levers of tolerances, friction and deformation.

Pressure gauges according to this invention provide pressure measurement on all brands of crimping tools, including 6-Ton D3 tools. Embodiments of this invention will work with any brand tool with a D3 die profile, including, but not limited to Huskie®, Greenlee®, Burndy®, Cembre®, and Milwaukee® brand crimping tools. Prior to this invention, a user needed to use a pressure gauge designed specifically for each brand of crimping tool.

Pressure gauges according to this invention are simple to use. In particular, this design eliminates the need to remove the tool crimp head to measure the pressure of the crimping tool. Additionally, this design eliminates the need to install additional dedicated fixtures on the crimping tool to measure the ram pressure.

This design incorporates a self-centering profile to avoid side-loading when mounting the pressure gauge in the crimping tool. Side-loading can damage gauges when the tool is actuated. For example, when measuring the crimping pressure produced by a traditional 12-ton crimping tool, if the pressure gauge is not centered onto the measurement cylinder, the cylinder will be side-loaded. This side-loading will blow apart the seals and damage the gauge, usually beyond repair.

The dial indicator on pressure gauges of this invention captures and holds the maximum pressure reading with the use of a simple manual lever. The lever can be easily rest for the next pressure reading.

Pressure gauges according to various embodiments of this invention include dual piston pressure sensors. Additionally, pressure measurement is accomplished with a simple hydro mechanical manometer display. Hydraulic press force measurement is accomplished with several pistons outside the press axis. Several pistons together give the cross-section of a large piston to withstand large pressing forces. Furthermore, an integrated valve displays a maximum value on the pressure gauge.

These and other features of a pressure gauge for crimping tools according to various embodiments of this invention overcome the shortcomings of known pressure gauges discussed above.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
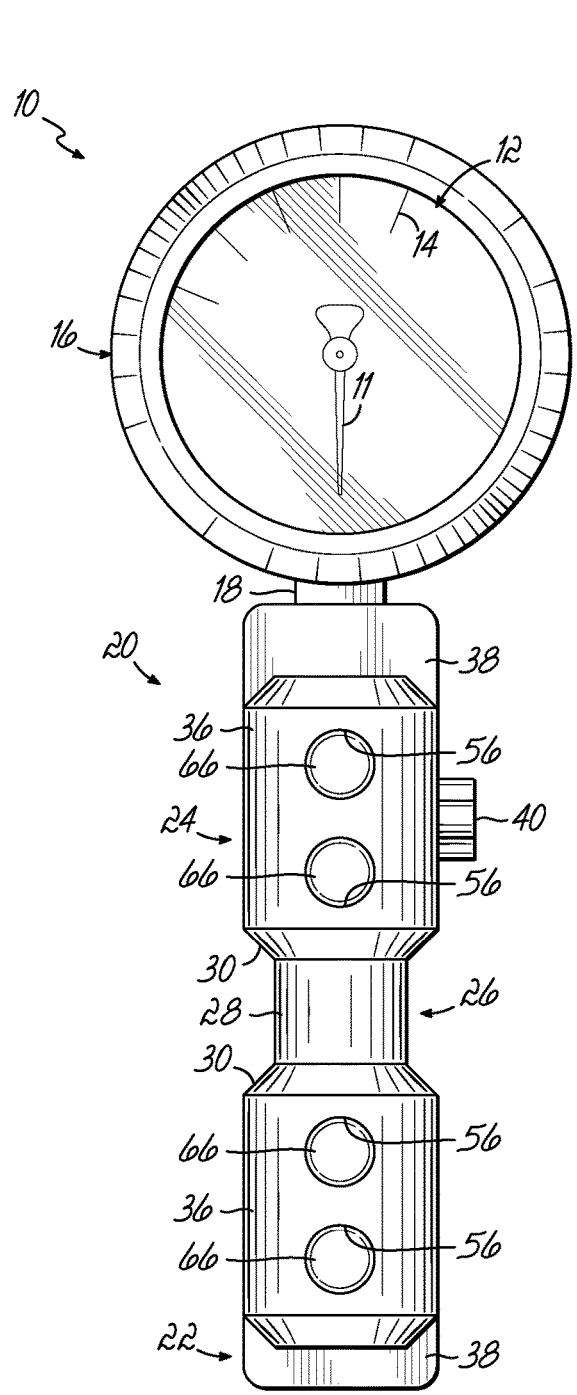
FIG. 1 is a front elevational view of a crimp pressure gauge according to one embodiment of this invention.
Figure 2:
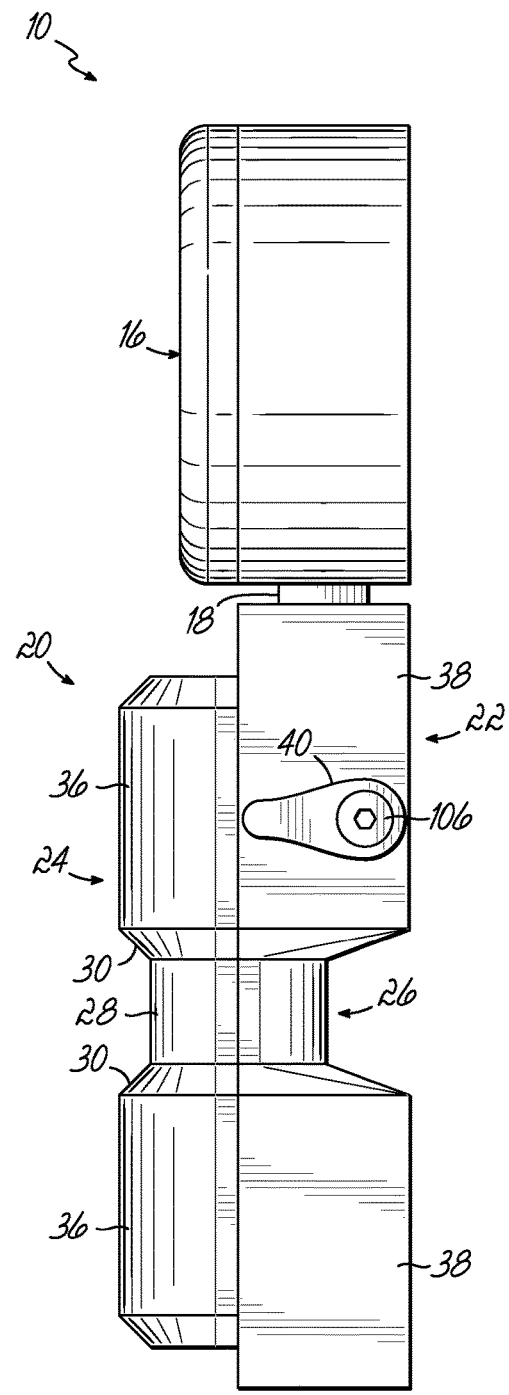
FIG. 2 is a side elevational view of the gauge of FIG. 1.

Referring to FIGS. 1 and 2, one embodiment of a crimp pressure gauge 10 according to this invention is shown. The pressure gauge 10 includes a manometer 12 with a needle 11 on the face of the manometer 12 and pressure indicia 14 to indicate a pressure measurement derived from the gauge 10. The manometer 12 may have a disc-shaped cover 16 surrounding it. The manometer 12 is connected via a stem 18 to a body 20 of the pressure gauge 10. The pressure gauge body 20 has a base component 22 and a top component 24. The top component 24 is mounted on the base component 22 as clearly shown in FIGS. 1 and 2. The top and base components 24, 22 each have a reduced dimension portion which combine to form a saddle 26 on the pressure gauge 10. The pressure gauge saddle 26 includes a throat 28 with a pair of tapered portions 30 spaced on either side of the throat 28. The saddle 26 provides a self-centering profile for the crimping jaws 32 of a crimping tool 34. Spaced on either side of the saddle 26 are first and second lobes 36 of the top 24 and first and second lobes 38 of the base 22. Mounted on one side of the upper lobe 38 of the base 22 is a holding lever 40 which functions to maintain the pressure reading on the manometer 12 until the holding lever 40 is released to reset the manometer 12.

Figure 3:
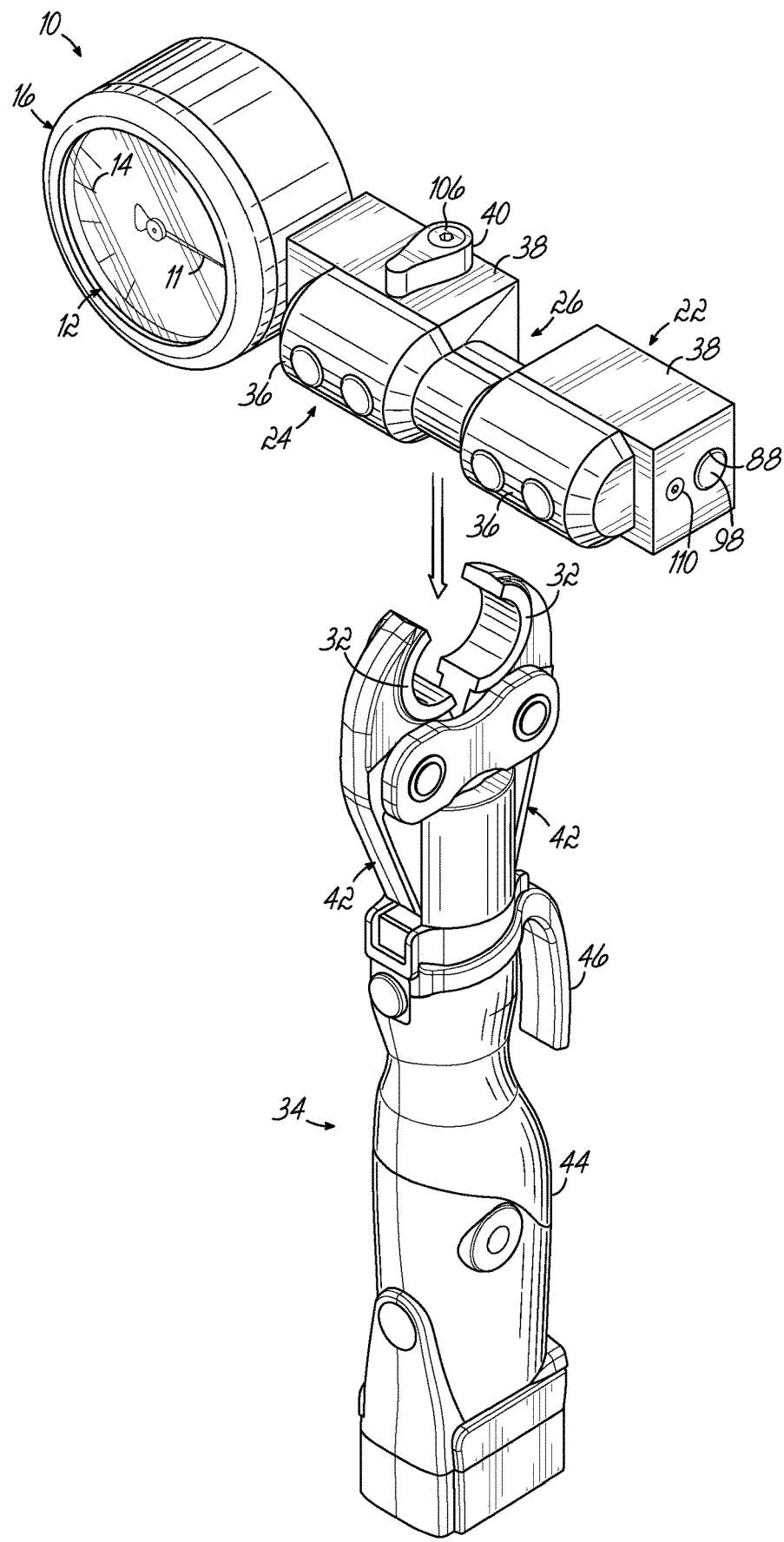
FIG. 3 is a perspective view of the gauge of FIGS. 1-3 being inserted into the jaws of a common crimping tool.
Figure 4:
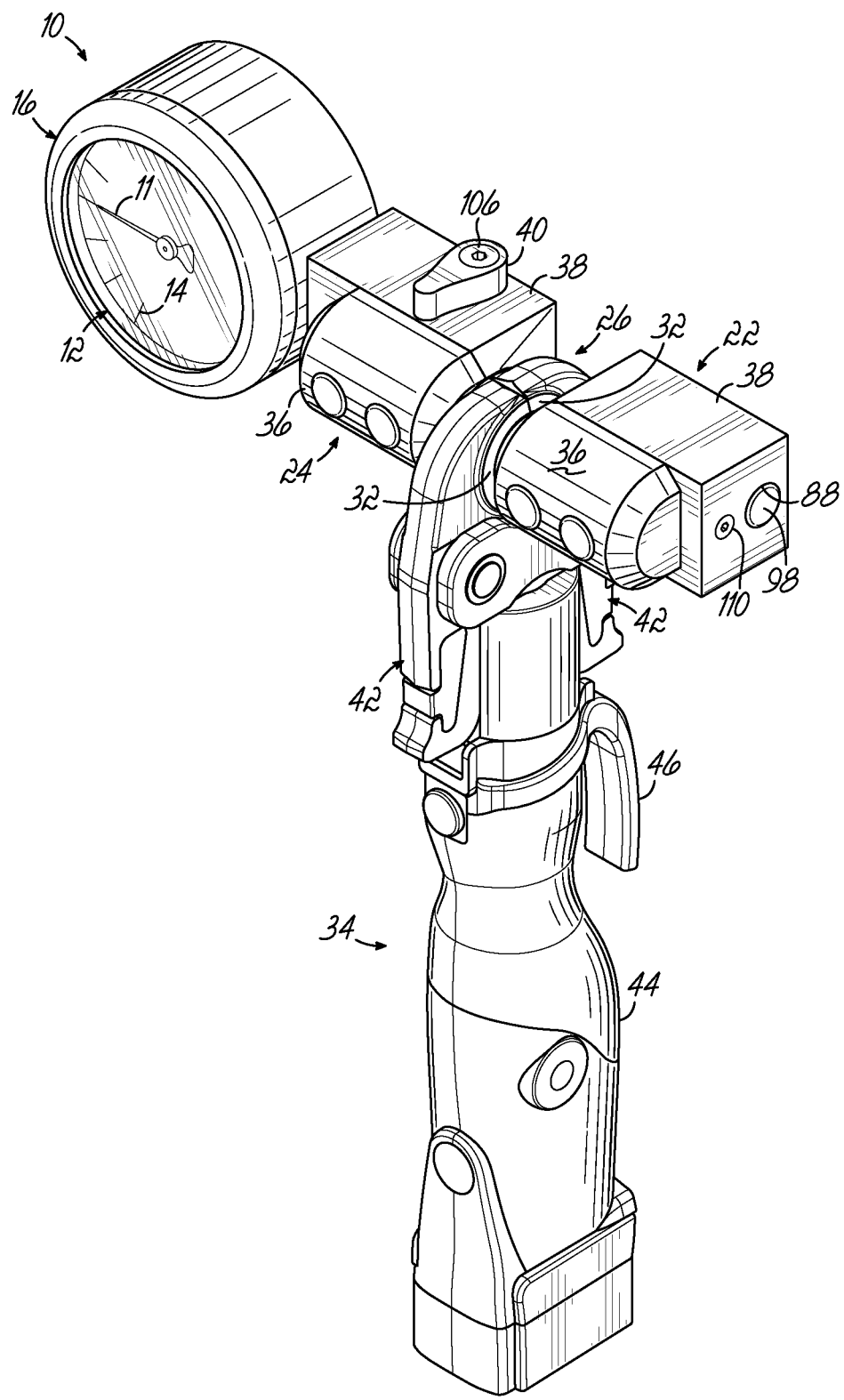
FIG. 4 is a view similar to FIG. 3 with the gauge measuring the crimping force of the crimping tool according to one aspect of this invention.

Referring to FIGS. 3 and 4, the pressure gauge 10 according to embodiments of this invention is useful to measure the crimping pressure of a crimping tool 34, one example of which is shown in FIGS. 3 and 4. It will be appreciated by one of ordinary skill in the art that the design and configuration of the crimping tool 34 shown in FIGS. 3 and 4 is exemplary only and simply used to show the utility and operation of the pressure gauge 10 according to various embodiments of this invention. A wide variety of crimping tools 34 may be utilized with the pressure gauge 10 of this invention. The crimping tools 34 which may be utilized with this invention may be manufactured by a wide variety of suppliers, vendors and manufacturers.

The exemplary crimping tool 34 shown in FIGS. 3 and 4 includes a pair of opposed crimp arms 42 at an upper end of the crimping tool 34. The crimp arms 42 each include a crimp jaw 32. The crimp jaws 32 function to apply pressure to a lug, sleeve, collar or other device (not shown) for electrical communication or other purposes as is well known in the art. The crimping tool 34 includes a body 44 which may be grasped by a user. Activation lever 46 is depressed toward the body 44 to actuate the crimping operation of the crimping tool 34.

As shown particularly in FIG. 4, the saddle 26 and opposed tapered regions 30 of the pressure gauge 10 receive the crimping jaws 32 of the crimping tool 34. The configuration of the saddle 26 allows for any initial misalignment between the crimping jaws 32 and the pressure gauge 10 to effortlessly and quickly be corrected so that the crimping jaws 32 seat firmly and securely on the throat region 28 of the pressure gauge 10 for an accurate pressure reading. As the crimping jaws 32 close and apply crimping pressure on the pressure gauge 10, the top 24 is forced toward the base 22 on the body 20 of the pressure gauge 10 to generate a pressure reading which is displayed by the needle n and indicia 14 on the face of the manometer 12. Advantageously, the pressure recorded by the pressure gauge 10 is generated by the actual crimp jaws 32 of the crimping tool 34 without the need for any added fixtures or other devices to mate the crimping tool 34 with the pressure gauge 10.

Figure 5:
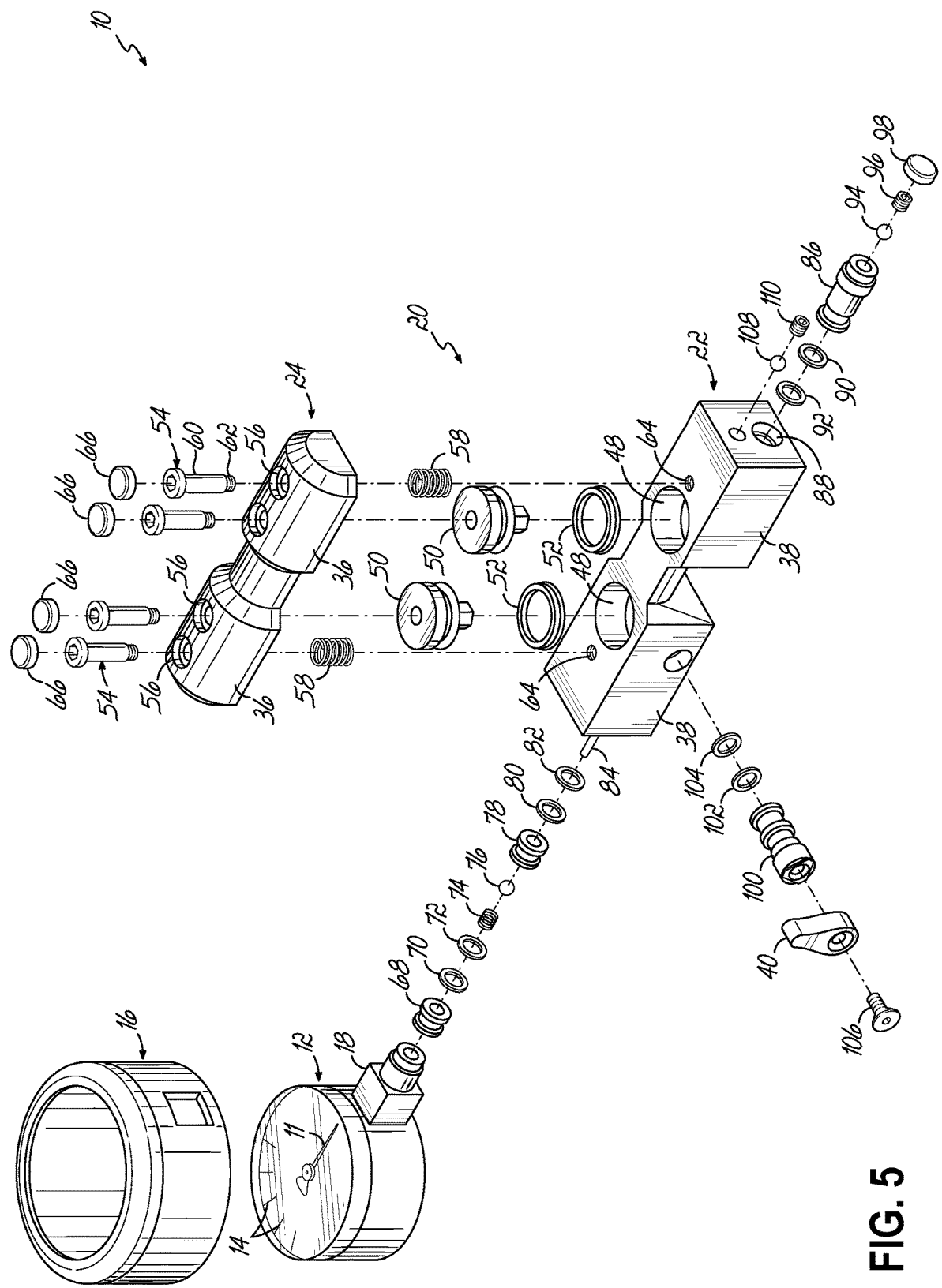
FIG. 5 is an exploded view of a crimp pressure gauge according to one embodiment of this invention.

Referring to FIG. 5, an exploded view of one embodiment of the pressure gauge 10 according to this invention is shown. The base 22 includes two sockets 48 spaced on either side of the saddle 26. Each socket 48 receives a piston 50 seated on a piston ring/seal 52. The pistons 50 support the top 24 of the body 20 of the pressure gauge 10. Four screws 54 are inserted through screw holes 56 in the top 24 as shown in FIG. 5. The outermost screws 54 on the top 24 have a compression spring 58 mounted on a shaft 60 of the screw 54. Tips 62 of the outermost screws 54 are seated within a divot 64 in an upper face of the base 22.

The two inner screws 54 which secure the top 24 to the base 22 extend through the pistons 50 and piston rings 52 and are seated within the sockets 48 of the base 22. A cover 66 is positioned over the head of each screw 54 to secure the top 24 to the base 22.

The manometer 12 and cover 16 are mounted to an upper end of the base 22 as shown in FIG. 5. The stem 18 of the manometer receives a valve housing 68, a support ring 70, a seal 72 and a spring 74 as shown in FIG. 5. Adjacent to the spring 74 is a ball 76, a nozzle 78, a support ring 80, a second seal 82 and a needle roller 84 to properly mount the manometer 12 to the base 22.

On the bottom end of the base 22, a piston 86 is inserted into an aperture 88. The proximal end of the piston 86 has a ring 90 and a seal 92 to seat it within the base 22 of the pressure gauge 10. The distal end of the piston 86 includes a ball 94, a screw 96 and a fixed cover 98 sealing the piston assembly in the base 22. A ball 108 is secured to the base 22 by a grub screw 110.

The holding lever 40 is mounted on a side of the base 22 and includes a shaft 100, a ring 102 and a seal 104 proximate one of the sockets 48 of the base 22. A countersunk screw 106 secures the holding lever 40 components to the base 22 for proper operation.

While one embodiment of a pressure gauge 10 is described in detail and shown herein, other designs, configurations and arrangements of the pressure gauge 10 according to this invention are contemplated. The pressure measurement is derived from the two pistons 50 spaced on either side of the saddle 26 when the top 24 is forced downwardly toward the base 22. Advantageously, a wide variety of crimping tool designs may be accurately measured with this pressure gauge at the crimping jaw or crimp die location without the need for added hardware to mate the crimping tool with the pressure gauge for accurate pressure measurement.

From the above disclosure of the general principles of this invention and the preceding detailed description of at least one embodiment, those skilled in the art will readily comprehend the various modifications to which this invention is susceptible. Therefore, we desire to be limited only by the scope of the following claims and equivalents thereof.

We claim:

1. A pressure measuring device to measure a pressure delivered by a crimping tool, the crimping tool having a pair of opposing crimp jaws which move toward each other to crimp a member positioned therebetween when the crimping tool is actuated, the pressure measuring device comprising:
    a body having a base component and a top component which are coupled together for movement relative to each other; and
    a pressure gauge coupled to the body and in communication therewith to display a pressure applied to the body as a result of the one of the crimp jaws contacting the base component and the other of the crimp jaws contacting the top component to thereby measure a crimping pressure delivered by the crimping tool;
    wherein the pressure measuring device accommodates crimping tools produced by a plurality of crimping tool manufacturers.

2. The pressure measuring device of claim 1 further comprising:
    a saddle formed in the body to thereby position the pair of opposing crimp jaws on the body.

3. The pressure measuring device of claim 2 wherein the saddle further comprises:
    a base component saddle portion; and
    a top component saddle portion.

4. The pressure measuring device of claim 1 further comprising:
    a holding mechanism which maintains a pressure reading on the pressure gauge until the holding mechanism is released.

5. The pressure measuring device of claim 1 further comprising:
    at least one piston positioned between the base component and the top component, the at least one piston being compressed when the top component and the base component are moved toward one another during a pressure measurement of the crimping tool.

6. The pressure measuring device of claim 5 further comprising first and second pistons spaced from each other in the body such that the crimping tool engages the body for a pressure measurement between the first and second pistons.

7. The pressure measuring device of claim 1 wherein the pressure measuring device accommodates a D3 crimping die.

8. The pressure measuring device of claim 1 which measures a pressure delivered directly by the crimp jaws of the crimping tool.

9. The pressure measuring device of claim 1 wherein the pressure gauge further comprises a hydro mechanical manometer.

10. A pressure measuring device to measure a pressure delivered by a crimping tool, the crimping tool having a pair of opposing crimp jaws which move toward each other to crimp a member positioned therebetween when the crimping tool is actuated, the pressure measuring device comprising:
    a body having a base component and a top component which are coupled together for movement relative to each other;
    a saddle formed in the body to thereby position the pair of opposing crimp jaws on the body, wherein the saddle further comprises a base component saddle portion and a top component saddle portion;
    a pressure gauge coupled to the body and in communication therewith to display a pressure applied to the body as a result of the one of the crimp jaws contacting the base component and the other of the crimp jaws contacting the top component to thereby measure a crimping pressure delivered by the crimping tool;
    a holding mechanism which maintains a pressure reading on the pressure gauge until the holding mechanism is released; and
    a pair of pistons positioned between the base component and the top component and spaced from each other with the saddle therebetween, the pair of pistons being compressed when the top component and the base component are moved toward one another during a pressure measurement of the crimping tool;
    wherein the pressure measuring device measures a pressure delivered directly by the crimp jaws of the crimping tool.

11. The pressure measuring device of claim 10 wherein the pressure measuring device accommodates a D3 crimping die.

12. The pressure measuring device of claim 10 wherein the pressure measuring device accommodates crimping tools produced by a plurality of crimping tool manufacturers.

13. The pressure measuring device of claim 10 which measures a pressure delivered directly by the crimp jaws of the crimping tool.

14. The pressure measuring device of claim 10 wherein the pressure gauge further comprises a hydro mechanical manometer.

15. A combination comprising:
    a crimping tool having a pair of opposing crimp jaws which move toward each other to crimp a member positioned therebetween when the crimping tool is actuated;
    a pressure measuring device to measure a pressure delivered by the crimping tool, the pressure measuring device further comprising
        (a) a body having a base component and a top component which are coupled together for movement relative to each other; and
        (b) a pressure gauge coupled to the body and in communication therewith to display a pressure applied to the body as a result of the one of the crimp jaws contacting the base component and the other of the crimp jaws contacting the top component to thereby measure a crimping pressure delivered by the crimping tool;
    wherein the crimping tool is produced by one of a plurality of crimping tool manufacturers and the pressure measuring device accommodates the crimping tool produced one of the plurality of crimping tool manufacturers.

16. The combination of claim 15 wherein the pressure measuring device further comprising:
    a saddle formed in the body to thereby position the pair of opposing crimp jaws on the body.

17. The combination of claim 15 wherein the pressure measuring device further comprising:

a holding mechanism which maintains a pressure reading on the pressure gauge until the holding mechanism is released.

18. The combination of claim 15 wherein the pressure measuring device further comprising:
   at least one piston positioned between the base component and the top component, the at least one piston being compressed when the top component and the base component are moved toward one another during a pressure measurement of the crimping tool.

19. The combination of claim 15 wherein the crimping tool accommodates a D3 crimping die and the pressure measuring device accommodates the crimping tool produced by a plurality of crimping tool manufacturers.

20. The combination of claim 15 wherein the pressure measuring device measures a pressure delivered directly by the crimp jaws of the crimping tool.

21. A method of measuring the crimp pressure delivered by a crimping tool, the crimping tool having a pair of opposing crimp jaws which move toward each other to crimp a member positioned therebetween when the crimping tool is actuated, the method comprising the steps of:

positioning a body of a pressure measuring device between the opposing crimp jaws of the crimping tool, the body having a top component and a base component which are coupled together for movement relative to each other;

directly contacting the top component with one of the crimp jaws of the pair of opposing crimp jaws;

directly contacting the base component with the other one of the crimp jaws of the pair of opposing crimp jaws;

applying a crimp pressure to the body of the measuring device with the pair of opposing crimp jaws;

moving the top component toward the base component based on the crimp pressure delivered by the crimp jaws; and reading the crimp pressure on a pressure gauge coupled to the body of the measuring device.

22. The method of claim 21 further comprising:
   centering the crimp jaws on the body prior to the applying step.

\* \* \* \* \*